United States Patent
Duan et al.

(10) Patent No.: US 8,878,448 B2
(45) Date of Patent: Nov. 4, 2014

(54) CIRCUIT AND METHOD FOR DRIVING LED LAMP WITH A DIMMER

(75) Inventors: Jianhua Duan, Shanghai (CN); Xuegang Ren, Shanghai (CN); Na Liu, Shanghai (CN)

(73) Assignee: BCD Semiconductor Manufacturing Limited, Shanghai (CN)

( * ) Notice: Subject to any disclaimer, the term of this patent is extended or adjusted under 35 U.S.C. 154(b) by 561 days.

(21) Appl. No.: 13/224,325

(22) Filed: Sep. 1, 2011

(65) Prior Publication Data
US 2012/0056548 A1 Mar. 8, 2012

(30) Foreign Application Priority Data
Sep. 2, 2010 (CN) .......................... 2010 1 0273288

(51) Int. Cl.
H05B 37/00 (2006.01)
H05B 33/08 (2006.01)
(52) U.S. Cl.
CPC .................................. *H05B 33/0815* (2013.01)
USPC ............................ 315/219; 315/277; 315/307
(58) Field of Classification Search
USPC ............. 315/185 R, 193, 219, 224, 307, 291, 315/276, 277
See application file for complete search history.

(56) References Cited

U.S. PATENT DOCUMENTS

| 7,030,572 | B2 * | 4/2006 | Nijhof et al. ................... 315/291 |
| 8,138,685 | B2 * | 3/2012 | Yu et al. ......................... 315/291 |
| 2010/0013412 | A1 * | 1/2010 | Archibald et al. ............ 315/294 |

* cited by examiner

*Primary Examiner* — David H Vu

(57) ABSTRACT

A system for driving an LED (light-emitting diode) lamp includes a dimmer circuit coupled to a line input voltage for varying a magnitude of an input voltage and a transformer having a primary winding, a secondary winding, and one or more auxiliary windings, the primary winding coupled to the dimmer circuit. The system also includes an output rectifying circuit coupled to the secondary winding for providing an output current to the LED lamp and a power switch coupled to the primary winding for controlling a current flow in the primary winding. The system further includes a controller having a comparator and a capacitor for providing a control signal to control the power switch for regulating the output current. The controller coupled to the dimmer circuit for receiving an average input voltage signal from the dimmer circuit, wherein the control signal is characterized by a duty cycle that is determined by a ratio of a charging current to a discharging current of the capacitor, and the ratio is related to the average input voltage signal from the dimmer circuit.

13 Claims, 6 Drawing Sheets

CIRCUIT AND METHOD FOR DRIVING LED LAMP WITH A DIMMER

CROSS-REFERENCES TO RELATED APPLICATIONS

This application claims the benefit of China Patent Application No. 201010273288.1 filed Sep. 2, 2010, commonly owned and incorporated by reference herein which is commonly owned and incorporated by reference in its entirety herein for all purposes.

BACKGROUND OF THE INVENTION

The present invention relates generally to the field of LED lighting systems. More particularly, embodiments of the present invention relate to circuits and methods for a switching power supply for driving an LED lighting system.

As energy demand increases, an imbalance exists in the demand and supply of energy sources. With cost of energy continuing to rise, energy-saving green technology is becoming increasingly important. As an example, the energy consumption in lighting systems can be as high as 20% of the total energy consumption. Therefore, energy efficient light systems can have a big impact in reducing energy consumption.

In particular, LED (light-emitting diode) lamps have the advantages of high efficiency, small volume, and the ability to provide a single light color. As a result, LED lamps have found wide applications in lighting and backlight applications.

The ability to adjust the brightness of a lighting system enables the user to tailor the lighting system to the need of a particular environment that can result in substantial savings in energy costs. Conventional techniques in adjusting the brightness often use a dimmer circuit, which removes either the front portion in the input voltage AC (alternate current) cycle, as in leading-edge dimmers, or the rear portion in the input Ac cycle, as in trailing-edge dimmers.

However, in lighting systems, it has been challenging to control the brightness of lighting systems based on different light sources. As described above, LED lamps have many advantages, but without proper voltage supply and precise current control, the efficiency and heat consumption of an LED lamp can suffer, leading to shortened life time. It is especially changing to use dimmers with an LED lamp.

Therefore, improved brightness control in LED light systems is highly desirable.

BRIEF SUMMARY OF THE INVENTION

Conventional methods tend to offer limited brightness adjustment range, imprecise current control, and can cause flickers in lighting output. To overcome these limitations, embodiments of the present invention provide LED lamp driving circuits that have the advantages of wide range brightness control, precise current control, and compatibility with various dimmer circuits. Some embodiments of the invention have been applied to a SMPS (switching mode power supply) controller used in an LED lighting system with a dimmer circuit. In specific embodiments, the control circuit is configured control the current supply to the LED lamp by varying the switching frequency and peak current in response to an average voltage from a dimmer. But it would be recognized that the invention has a much broader range of applicability. For example, techniques presented herein can also be used in a fluorescent light system or with a different power supply.

According to an embodiment of the present invention, a control circuit for providing a pulsed control signal includes an input terminal for receiving an input voltage, an output terminal for providing a pulsed control signal, a capacitor, and a comparator. The pulsed control signal is characterized by a duty cycle that is determined by a charging current and a discharging current coupled to the capacitor, the charging current and the discharging current being related to the input voltage. In an embodiment, the charging current is determined by a difference between a first signal and a second signal, and the discharging current is determined by a sum of the first signal and the second signal. Here, the first signal is derived from the input voltage, and the second signal is derived from a first reference signal.

In a specific embodiment, the above control circuit also includes a first PMOS current mirror coupled to the first signal and a first NMOS current mirror coupled to the second signal. A first output of the first NMOS current mirror is coupled to a first output of the first PMOS current mirror for providing the difference between the first signal and the second signal. A second PMOS current mirror is coupled to a second output of the first NMOS current mirror. An output of the second PMOS current mirror is coupled to a second output of the first PMOS current mirror for producing the sum of the first signal and the second signal. In an embodiment, the duty cycle of the pulsed control signal is determined by $(I1-I2)/(I1+I2)$, wherein I1 represents the first signal and I2 represents the second signal.

According to another embodiment of the present invention, a system for driving an LED (light-emitting diode) lamp includes a dimmer circuit coupled to a line input voltage for varying a magnitude of an input voltage, a transformer having a primary winding, a secondary winding, and one or more auxiliary windings. The primary winding is coupled to the dimmer circuit. The system also includes an output rectifying circuit coupled to the secondary winding for providing an output current to the LED lamp, and a power switch coupled to the primary winding for controlling a current flow in the primary winding. Moreover, the system includes a controller having a comparator and a capacitor for providing a control signal to control the power switch for regulating the output current. The controller is coupled to the dimmer circuit for receiving an average input voltage signal from the dimmer circuit. The control signal is characterized by a duty cycle that is determined by a ratio of a charging current to a discharging current coupled to the capacitor. The ratio is related to the average input voltage signal from the dimmer circuit.

In an embodiment of the system, the charging current is determined by a difference between a first signal and a second signal, and the discharging current is determined by a sum of a third signal and a fourth signal. The first signal and the third signal are derived from the average input voltage signal, and the second signal and the fourth signal are derived from a first reference signal. In another embodiment, the first signal is derived from the average input voltage signal through a first current mirror, the third signal is derived from the average input voltage signal through a second current mirror, the second signal is derived from the first reference signal through a third current mirror, and the fourth signal is derived from the first reference signal through a fourth current mirror. In an embodiment, the charging current is derived from a fifth current mirror coupled a first node coupled to the first signal, and the second signal, and the discharging current is derived from a sixth current mirror connected to the third signal and the fourth signal. In a specific embodiment each of the first, the second, and the fifth current mirrors comprises PMOS transistors. In an embodiment, each of the third, the fourth, and the sixth current mirrors comprises NMOS transistors.

In an embodiment of the system, the charging current is determined by a difference between a first signal and a second signal, and the discharging current is determined by a sum of the first signal and the second signal. The first signal is derived from the average input voltage signal, and the second signal is derived from a first reference signal. In a specific embodiment, a minimum output current provided to the LED lamp is about 2% of a maximum output current.

In another embodiment of the system, the controller also includes a voltage follower for receiving the average input voltage signal, a substractor coupled to the voltage follower, a first current mirror coupled to the substractor, a current selector configured for receive a current from the first current mirror, and a second current mirror configured to receive a first reference voltage and to provide three reference currents. Two of the reference currents are coupled to the current selector. The current selector is configured to provide two output signals. A first output signal is coupled to a peak current comparator, and a second output signal is coupled to a constant-current control circuit for adjusting the ratio of charging and discharging current.

According to an alternative embodiment of the invention, a driver circuit for an LED lamp includes a transformer having a primary winding, a secondary winding, and one or more auxiliary windings, a dimmer circuit coupled to a power source and the primary winding, an output rectifying circuit coupled to the secondary winding for providing an output current to the LED lamp, and a controller coupled to the dimmer circuit to receive an average input voltage from the dimmer circuit (DIM). The controller being configured to vary the output current according to the average input voltage.

In a specific embodiment of the above driver circuit, the controller is configured to provide an output current Io characterized by the following equations:

$$Ipk = \frac{Vcs}{Rcs};$$

$$Ipks = N * Ipk;$$

$$Io = \frac{Tons}{2*Tsw} * Ipks = \frac{N*Tons*Vcs}{2*Tsw*Rcs};$$

wherein
Ipk is the peak primary current,
Ipks is the peak secondary current,
Vcs is a reference voltage in the controller;
Rcs is a resistance of the peak current detection,
N is the turn ratio between the primary winding and secondary winding.

In an embodiment of the driver circuit, the controller includes a current control module. The current control module includes:
a voltage follower for receiving the DIM signal;
a substractor coupled to the voltage follower;
a first current mirror coupled to the substractor,
a current selector configured to receive a current from the first current mirror; and
a second current mirror configured to receive a first reference voltage and to provide three reference currents, two of the reference currents being coupled to the current selector, wherein the current selector are configured to provide two output signals, a first output signal coupled to a peak current comparator, a second output signal coupled to a constant-current control circuit for adjusting a ratio of charging and discharging.

In an embodiment, the substractor includes a first resistor, a second resistor, a third resistor, and an operational amplifier, the substractor configured to produce a Vdim_in signal cauterized by:

$$V\text{dim\_in} = VREF2 * \left(1 + \frac{R305}{R304}\right) - \frac{R305}{R304} * V\text{dim}$$

wherein Vdim is the voltage at the DIM terminal.

In an embodiment, the maximum current selector includes three current mirrors and is configured received three input currents I1, I2, and I3, with I2=I3, wherein:
If I1>I2, then the output current=I2, and
If I1<I2, then the output current=I1

In an embodiment, when the DIM signal is greater than a reference signal, the output current of the maximum current selector is set to zero.

A further understanding of the nature and advantages of the present invention may be realized by reference to the remaining portions of the specification and the drawings.

DETAILED DESCRIPTION OF THE INVENTION

The description below will be with reference to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
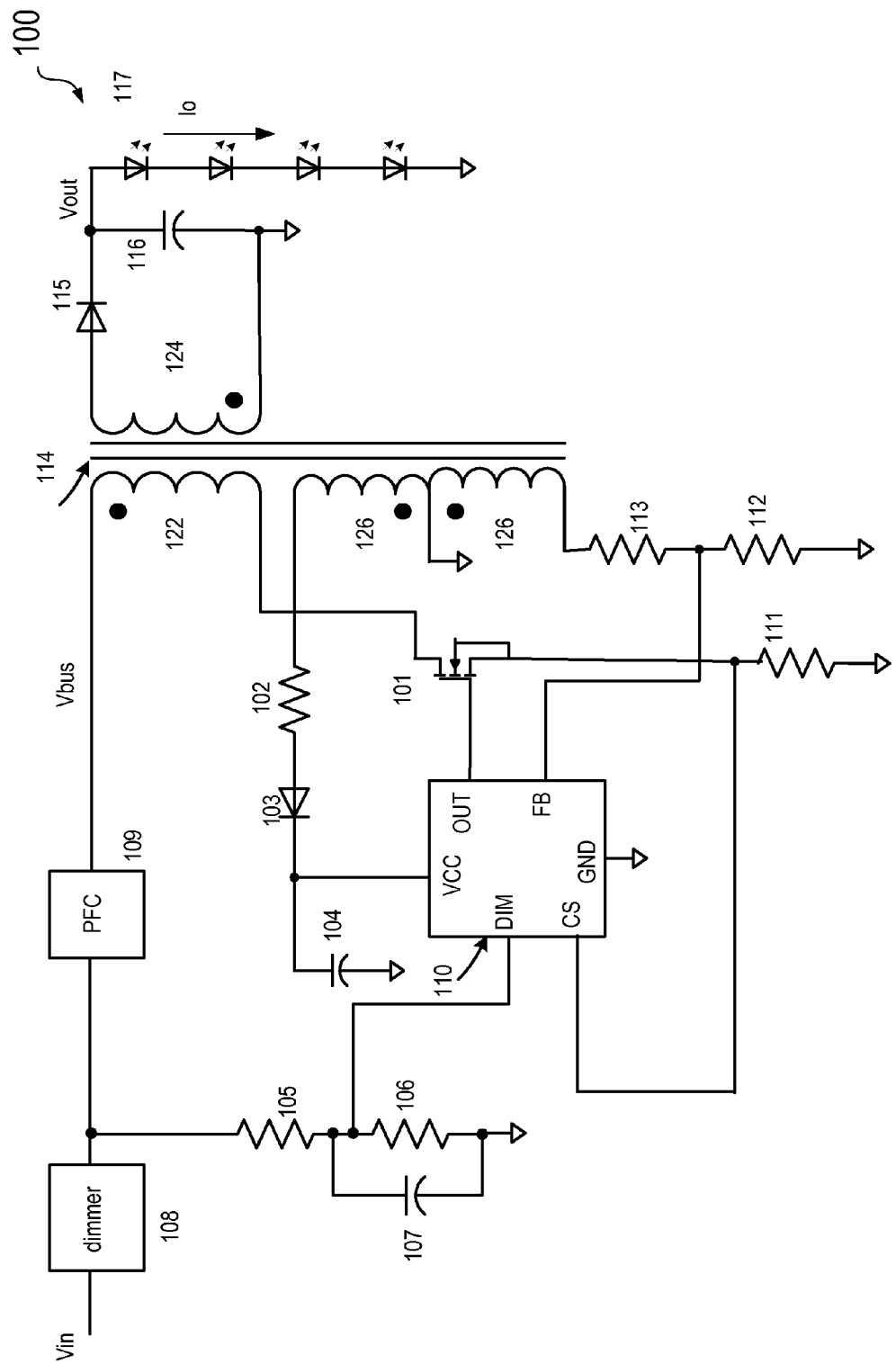
FIG. 1 is a simplified diagram illustrating a system for driving an LED lamp according to an embodiment of the present invention.

FIG. 1 is a simplified diagram illustrating a system 100 for driving an LED lamp according to an embodiment of the present invention. As shown in FIG. 1, system 100 includes a dimmer circuit 108 couple to an input voltage source Vin, a controller 110, and a transformer 114. Transformer 114 has a primary winding 122, a secondary winding 124, and one or more auxiliary windings 126. Auxiliary winding 126 provides power supply VCC to controller 110 through diode 103 Secondary winding 124 provides an output voltage Vout and an output current Io to LED lamp 117 through a rectifying circuit including a diode 115 and a capacitor 116. The current sense (CS) terminal of controller 110 receives information regarding primary current flowing through power switch 101 through a current sense signal from current sense resistor 111. In FIG. 1, dimmer circuit 108 is used to vary the input line voltage to adjust the brightness of LED lamp 117.

As shown in FIG. 1, controller 110 is coupled to dimmer circuit 108 through a low-pass filter including resistors 105 and 106 and capacitor 107, to receive a signal DIM from dimmer circuit 108. Dimmer circuit 108 is used to vary the magnitude of input voltage Vin to vary the output to the LED lamp. In some embodiments, dimmer circuit 108 can be a conventional dimmer circuit that receives direct manual control or a wireless control signal. In response to the DIM signal, controller 110, which is coupled to power switch 101, is configured to adjust the average current in the secondary winding and provide a steady output current Io to the output. Dimmer circuit 108 is coupled to power factor correction module (PFC) 109 and primary winding 122 of transformer 114. When the OUT terminal of controller 110 is at a high voltage, primary side power switch 101 is turned on, the peak primary current is converted to a voltage signal to the CS terminal of controller 110 by current sense resistor 111. When the signal at the CS terminal reaches a reference level in the controller, a driver circuit is shut off, the control signal at the OUT terminal of controller 110 is closed, turning off power switch 101.

The FB terminal of controller 110 receives a feedback signal form auxiliary winding 126 that represents the output voltage Vout at the secondary winding. Based on the FB signal, controller 110 generates a signal Tons that indicates the conduction time of the secondary current. Controller 110 uses on-time signal Tons to control internal charging and discharging times of a capacitor, which in turn control the on time, or duty cycle, of control signal at the OUT terminal for regulating the output of the power supply.

As used herein, "Tsw" represents the period of voltage supply to LED lamp 117. In embodiments of the present invention, controller 110 is configured to adjust the ratio Tons/Tsw according to the variation of the DIM signal, which is related to the output of the dimmer circuit. In the primary-side control configuration shown in FIG. 1, output current Io can be derived from the following equations.

$$Ipk = \frac{Vcs}{Rcs};$$

$$Ipks = N * Ipk;$$

$$Io = \frac{Tons}{2*Tsw} * Ipks = \frac{N*Tons*Vcs}{2*Tsw*Rcs};$$

where
Ipk is the peak primary current,
Ipks is the peak secondary current,
Vcs is a reference voltage for a peak current comparator,
Rcs is the current sensing resistor, and
N is the ratio of coil turns of the primary winding and secondary winding.

As shown in the above equation, output current Io is proportional to the ration Tons/Tsw. In embodiments of the invention, controller 110 adjusts output current Io by varying Tons/Tsw and reference voltage Vcs. The current provided to LED lamp, Io, can be adjusted in a wide range. As described above, the DIM signal used in controlling Io is an average output voltage from dimmer 108. There is no need to determine the type of dimmer circuit and which portion of the input voltage cycle is removed by the dimmer circuit. Therefore, the methods described herein are compatible with different types of dimmer circuits.

Figure 2:
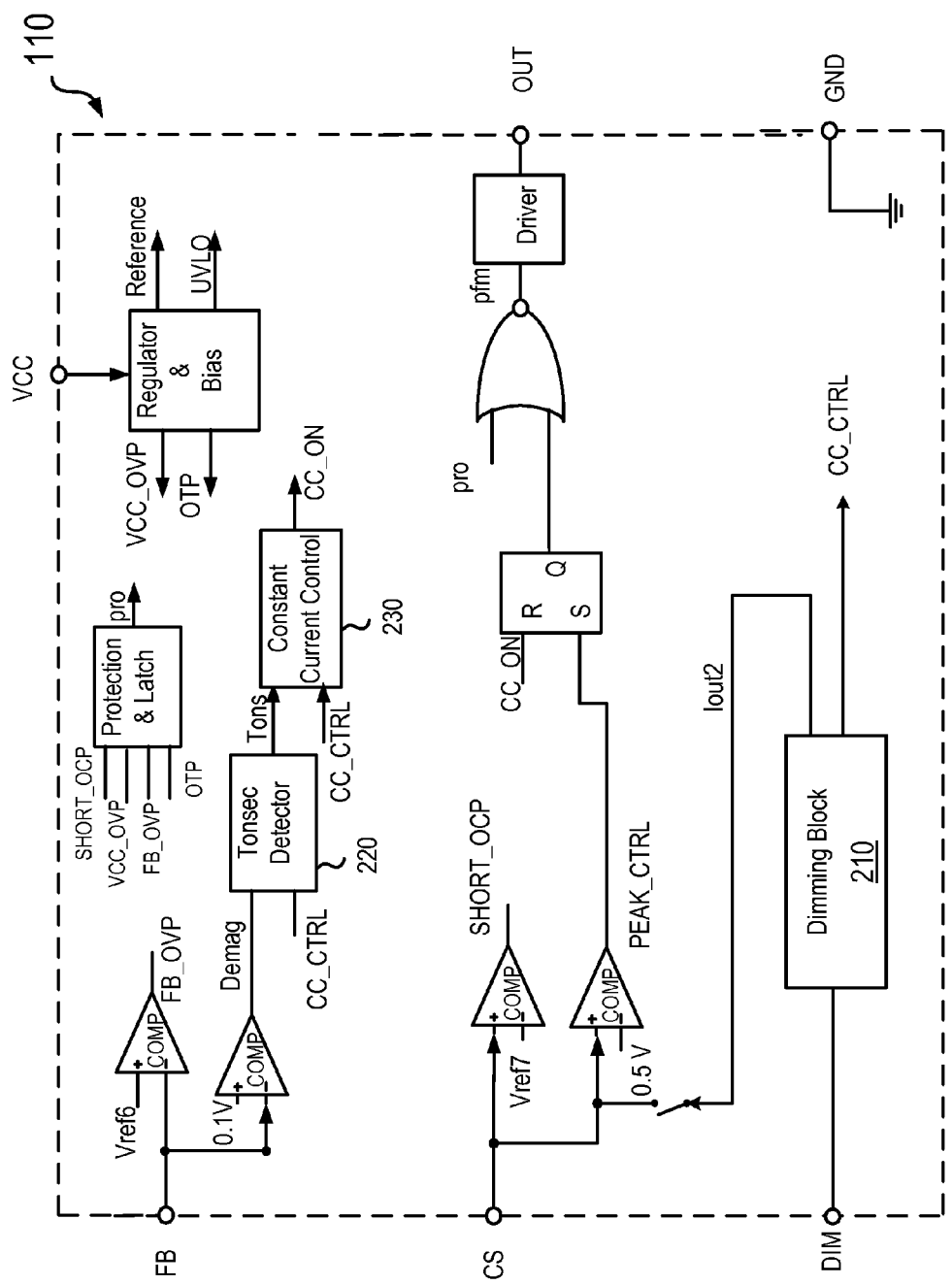
FIG. 2 is a simplified diagram illustrating a functional block diagram of the controller in the lighting system of FIG. 1 according to an embodiment of the present invention.

FIG. 2 is a simplified diagram illustrating a functional block diagram of controller 110 in the lighting system of FIG. 1 according to an embodiment of the present invention. As shown in FIG. 2, controller 110 has terminals VCC, FB, DMI, OUT, and GND, whose functions are described below. Controller 110 receives power from terminal VCC. At start-up, VCC is charged up to a start-up voltage sufficient for internal power and bias voltages. Controller 110 also receives feedback signal at the FB terminal. Based on the feedback signal, which reflects the output voltage, controller 110 produces a Tons signal according to the conduction time of the secondary side rectifying circuit. Controller 110 is configured to use the Tons signal to adjust an internal charging and discharging current ratio and control the on time in the next control cycle. As described below in connection with Dimming Block 210, controller 110 is also configured to adjust the ratio Tons/Tsw according to the signal DIM.

When the current sense signal at the CS terminal reaches a pre-set current turn off reference voltage, controller 110 generate a PEAK_CTRL signal to turn off pulse control signal PFM. The driver circuit is turned off, which causes the control signal at the OUT terminal to turn off.

Figure 3:
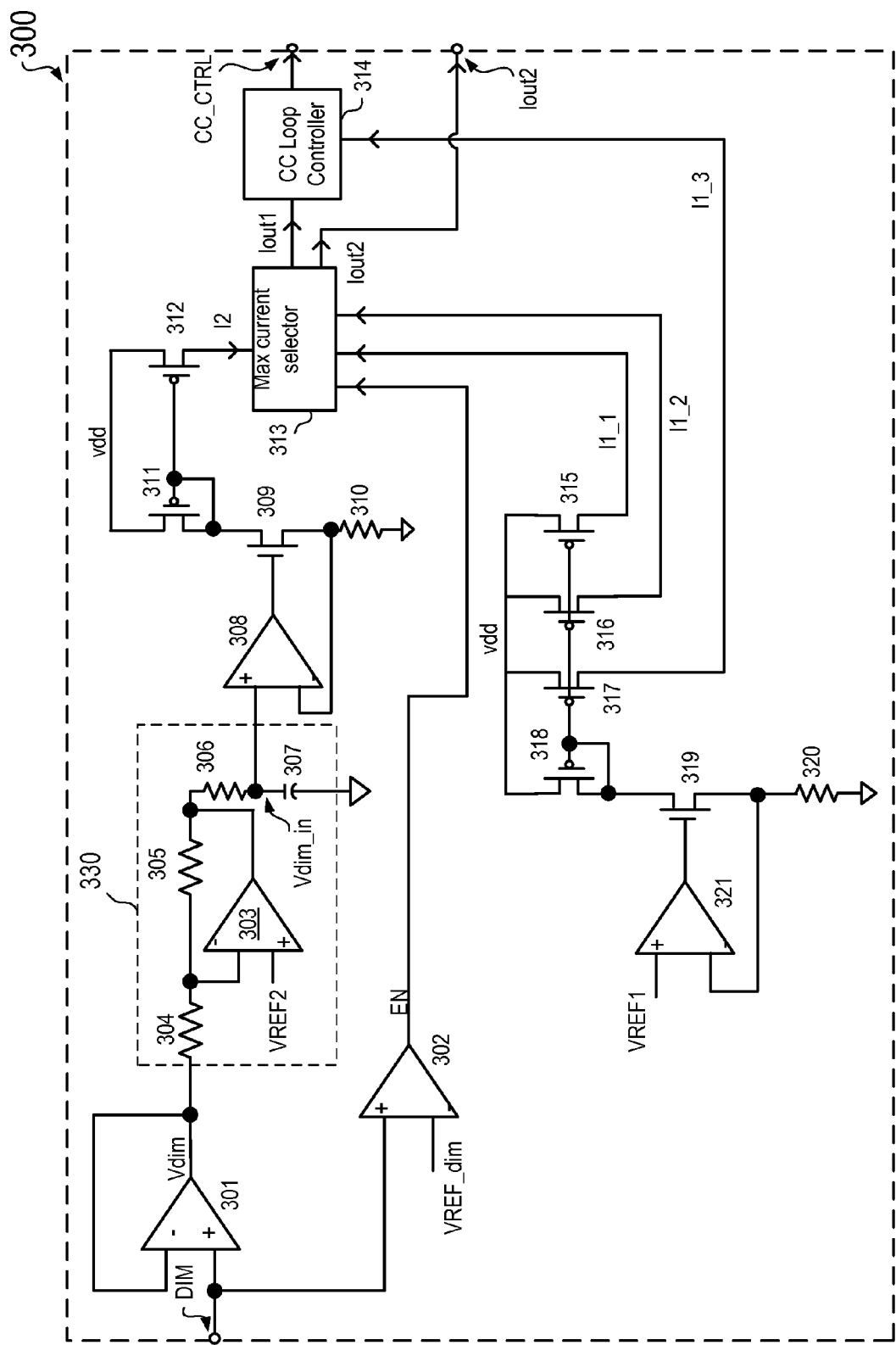
FIG. 3 is a simplified diagram illustrating a portion of the controller for dimmer control according to an embodiment of the present invention.

FIG. 3 is a simplified diagram illustrating a portion of the controller for dimmer control according to an embodiment of the present invention. Dimming Block 300 in FIG. 3 is an exemplary embodiment of Dimming Block 210 in FIG. 2. The DIM terminal of controller 110 as shown in FIGS. 1 and 2 receives a DC voltage signal provided by a dimmer circuit through a low-pass filter. Controller 110 uses the DIM signal to determine the output current. As shown in FIG. 3, the DIM signal enters Dimmer Block 300 through a voltage follower 301, which produces a Vdim signal. The Vdim signal is coupled a substractor 330, which includes first resistor 304, second resistor 305, third resistor 306, and operational amplifier 303. As shown in FIG. 3, a first input of operational amplifier 303 is coupled to a node between resistors 304 and 305, and a second input of operational amplifier 303 is coupled to a reference voltage VREF2. The output of Substractor 330, Vdmin_in, can be expressed by the following equation.

$$V\dim\_in = VREF2 * \left(1 + \frac{R305}{R304}\right) - \frac{R305}{R304} * V\dim$$

Through amplifier 308, the Vdim_in signal is converted to a voltage signal at resistor 310, which is reflected as current I2 through a first current mirror including transistors 311 and 312. Dimming Block 300 also includes a reference voltage VREF1 which, through amplifier 321, resistor 320, and a second current mirror including transistor 315, 316, 317, and 318, produces three current signals, I1_1, I1_2, and I1_3.

Dimming Block 300 also includes a Max current selector 313, which is coupled to current signals I2, I1_1, and I1_2, provides two output signals Iout1 and Iout2. Iout1 is coupled to a constant current (CC) Loop Controller 314, which outputs signal CC_CTRL used in Controller 110 for charging and discharging a capacitor to produce a constant current (CC) control signal. As shown in FIG. 2, Iout2 is used by Controller 110 in controlling the peak current in the primary winding.

As shown in FIG. 3, Max current selector 313 also receives an EN signal from comparator 302, when the DIM signal is greater than a reference voltage VREF_dim. The EN signal forces Iout1 and Iout2 to be zero and, as a result, I1_3 becomes the only non-zero input the CC Loop Controller 314.

Under this condition, the maximum output current can be controlled by a reference voltage and hence be maintained accurately.

Figure 4:
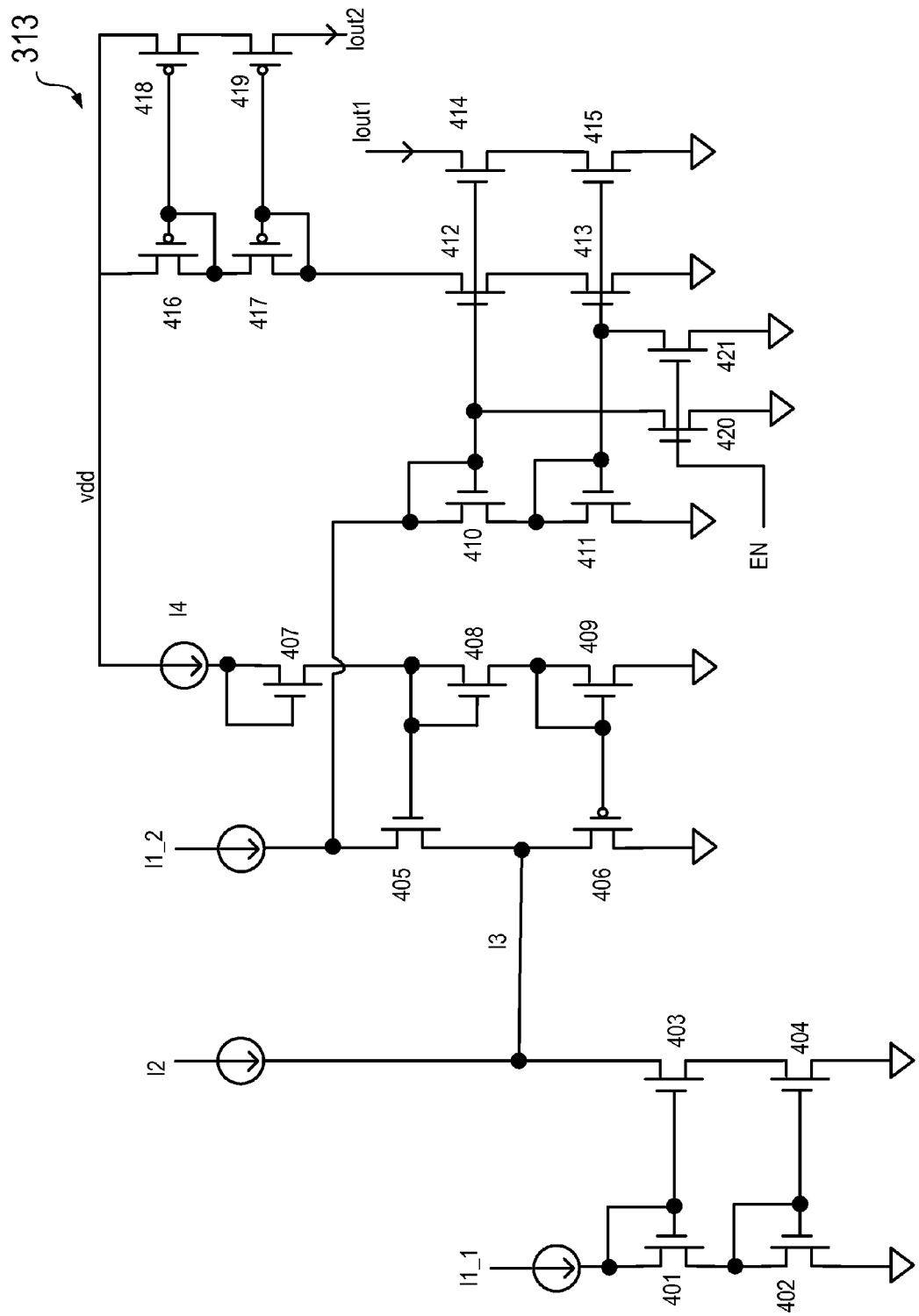
FIG. 4 is a simplified circuit diagram illustrating a maximum current selector circuit in FIG. 3 according to an embodiment of the present invention.

FIG. 4 is a simplified circuit diagram illustrating a maximum current selector circuit 313 in FIG. 3 according to an embodiment of the present invention. As described above in connection with FIG. 3, Max current selector 313 has three inputs: I2, I1_1, and I1_2. In some embodiments, I1_1 and I1_2 are equal. Max current selector 313 also has two outputs, Iout1 and Iout2. As described below, the values of Iout1 and Iout2 are determined by the values of inputs I2, I1_1, and I1_2.

As shown in FIG. 4, I1_1 and I2 are coupled through a current mirror including transistor 401, 402, 403, and 404. When I2 is less than I1_1, current I3=I1_1−I2. At this time, transistor 405 is turned on, and transistor 406 is turned off. I4=I1_2−I3=I1_2−(I1_1−I2)=I2. On the other hand, when I2 is greater than I1_1, I3=I2−I1_1. Transistor 405 is turned off, and transistor 406 is turned on. As a result, I4=I1_2.

In FIG. 4, current I4 is coupled to output Iout1 through a current mirror that includes transistors 410, 411, 412, 413, 414, and 415. Current I4 is also coupled to output Iout2 through a current mirror that includes transistor 416, 417, 418, and 419. By properly selecting the transistor ratios in the current mirrors, outputs Iout1 and Iout2 can be made to vary with I2, when I2 is less than I1_1. On the other hand, when I2 is greater than I1_1, outputs Iout1 and Iout2 are determined by I1_1, which is a fixed reference signal in this example. As described above, the maximum values for Iout1 and Iout2 are limited by the greater of I2 and I1_1.

Figure 5:
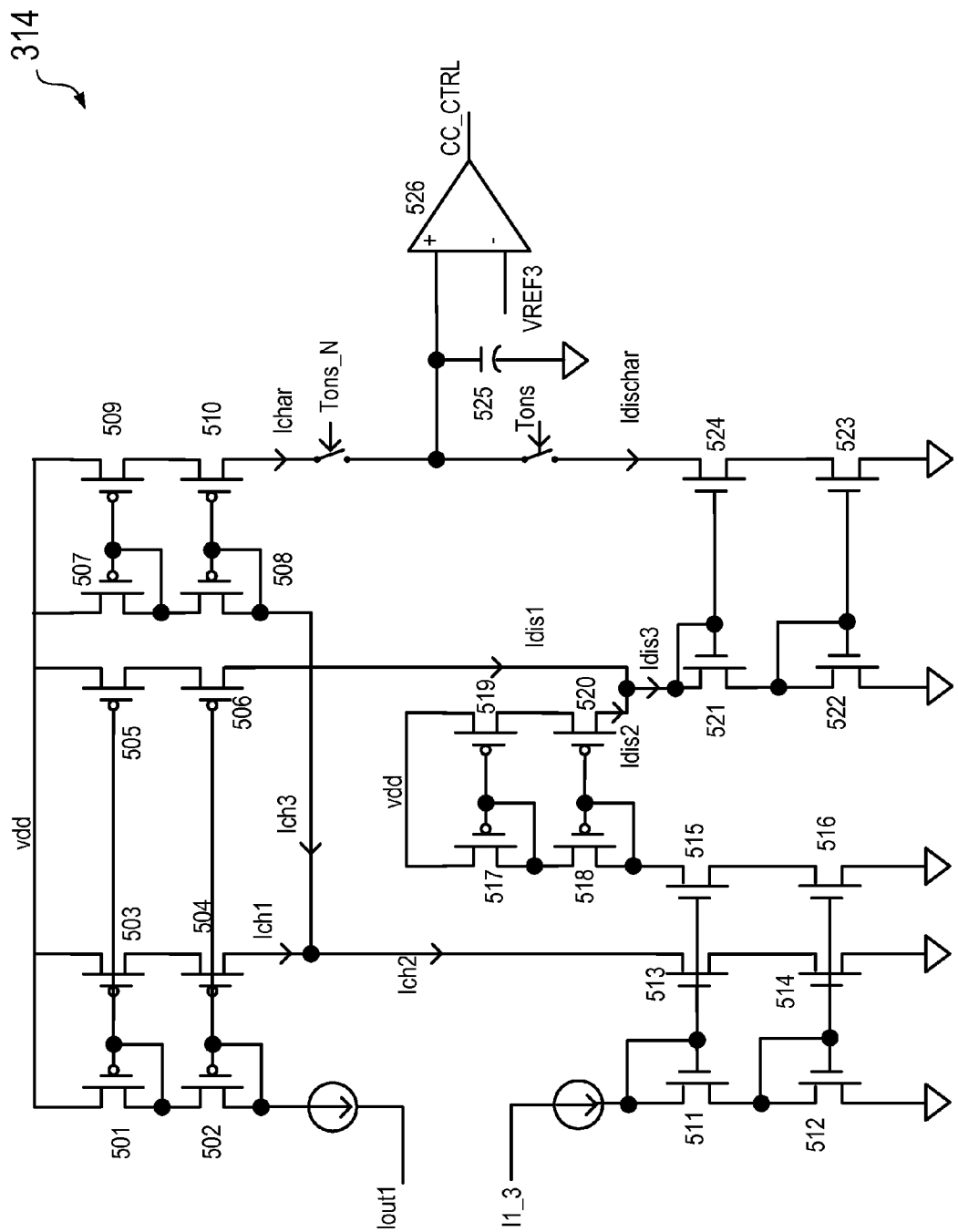
FIG. 5 is a simplified circuit diagram illustrating a constant-current comparison circuit in FIG. 3 according to an embodiment of the present invention.

FIG. 5 is a simplified circuit diagram illustrating an example of constant-current control circuit 314 in FIG. 3 according to an embodiment of the present invention. As described above in connection with FIG. 3, constant-current control circuit 314 receives two input signals: I1_3 and Iout1. As shown in FIG. 5, reference current I1_3 is provided to a current mirror, including transistors 511, 512, 513, and 514, which outputs a current Ich2. Further, current I1_3 is also mirrored to a current Idis2 through current mirror circuits of transistors 515, 516, 517, 518, 519, and 520. Similarly, Iout1, through current mirrors, including transistors 501, 502, 503, 504, 505, and 506, is mirrored into Ich2 and Idis1.

As shown in FIG. 5, constant-current control circuit 314 produces a constant-current control signal CC_CTRL, which is the output of a comparator 526 that compares the voltage at capacitor 525 with a reference voltage VREF3. Capacitor 526 is charged by a charging current Ichar when a first switch is turned on by signal Tons_N, and discharged by a discharging current Idischar when a second switch is turned on by signal Tons. As described above, Tons indicates secondary side conduction. As shown in FIG. 2, Tons is generated by the Tonsec Detector block 340 which receives CC_CTRL, and Tons_N is complementary to Tons.

As shown in FIG. 5, charging current Ichar is derived from Ich3 through a current mirror, including transistors 507, 507, 509, and 510, with $$Ich3 = Ich2 - Ich1.$$

Similarly, discharging current Idischar is derived from Idis3 through a current mirror 521, 522, 523, and 524, with $$Idis3 = Idis1 + Idis2.$$

Therefore, TONS can be controlled by the CC_CTRL signal, which in turn can be varied by currents I2, I1_1, I1_2, and I1_3. As shown in FIG. 3, these current components are controlled by the DIM signal.

In a specific embodiment, with properly selected current mirror transistors, $$Ichar = Ich3 = Ich2 - Ich1 = Iout1 - I1\_3$$

$$Idischar = Idis3 = Idis1 + Idis2 = I1\_3 + Iout1, \text{ and}$$

$$Ichar/Idischar = (Iout1 - I1\_3)/(Iout1 + I1\_3)$$

It can be seen that the ratio of charging current to discharging current can be expressed as a difference between two quantities Iout1 and I1_3 and the sum of those two quantities, where Iout1 is related to a varying input signal and I1_3 is an internal reference signal. By properly selecting the reference signal, the ratio Ichar/Idischar can be made to vary over a wide range. For example, by setting I1_3 less than but approximately equal to the minimum value of Ichar, the minimum value of the ratio Ichar/Idischar can be made arbitrarily small. As described below, this wide range of Ichar/Idischar can be used to vary the duty cycle of current flow in the transformer and provide a wide range of output current control.

As described above, the high level of control signal TONS coincide with the discharging of capacitor 525, and the low level of TONS coincides with the charging of capacitor 525. Depending on the output of the dimmer circuit, the DIM voltage varies. In FIG. 3, when voltage signal DIM decreases, Vdim_in rises. As a result I2 increases. As a result, the outputs of Max current selector 313 also increase. It follows that the charging current increases, and the discharging current decreases. By varying the ratio of charging and discharging currents, the pulse width of CC_CNTL can be controlled. In constant-current mode, controller 110 produces an output signal OUT with a duty cycle determined by CC_CNTL. This duty cycle, in turn, determines the magnitude of the output current.

An example of controlling LED driving circuit with a dimmer can be described with reference to FIG. 3. In an embodiment, the output range of the dimmer circuit is 0-3V, and Vref_dim is set at 3.1V.

If the DIM voltage is greater than Vref_dim, the Iout1 and Iout2 from Max current selector 313 are both 0. In this embodiment, the current mirror transistors in FIG. 5 are chosen such that Ich2=6 uA, Ich1=0 uA, Idis1=0 uA, and Idis2=4.5 uA. With Ich3=Ich2−Ich1 and Idis3=Idis1+Idis2, the ratio of charging and discharging currents becomes: Ich/Idis=6/4.5. Thus, Tons/Tsw=1/dis/(1/Idis+1/Ich)=4/7. Under this condition, the peak voltage comparator voltage is at a maximum, 0.5V.

On the other hand, if the DIM voltage is 0, Ich2=6 uA, Ich1=5 uA, Idis1=15 uA, and Idis2=4.5 uA. The ratio of charging and discharging currents becomes: Ich/Idis=1/19.5. Thus, Tons/Tsw=1/dis/(1/Idis+1/Ich)=1/20.5. Under this condition, the peak voltage comparator voltage is at a minimum, 0.14V.

If the transformer coil turn ratio is 5, and peak current sensing resistor is 1.25 ohms, from equation:

$$Io = \frac{N * Vcs * Tons}{2 * Tsw * Rcs}$$

we can get maximum output current Iomax=0.571 A, minimum output current Iomin=0.0136 A, and Iomin/Iomax=2.38%. It can be seen that with the variation of the DIM voltage, the adjustable output current can vary between the maximum output current and about 2% of the maximum output current. In other embodiments, with different circuit parameters, different ratios of charging and discharging currents can be obtained. The adjustable output range can be extended to 1% of the maximum output.

Figure 6:
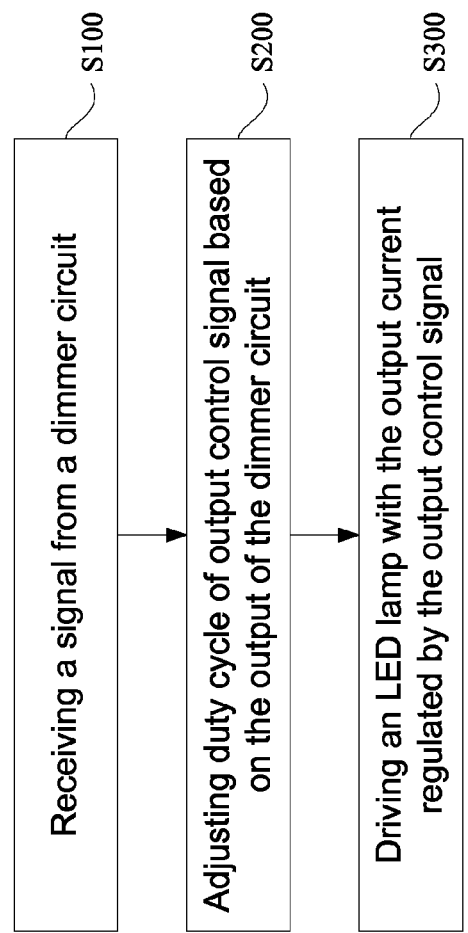
FIG. 6 is a simplified flow chart illustrating a method for driving an LED lamp with a dimmer circuit according to an embodiment of the present invention.

FIG. 6 is a simplified flow chart illustrating a method for driving an LED lamp with a dimmer circuit according to an embodiment of the present invention. As shown in FIG. 6, the method includes the following steps:

S100—receiving an average output voltage DIM from a dimmer circuit which is configured to adjustR an input line voltage;

S200—varying signals TONS and Tsw to adjust average output current; and

S300—driving an LED lamp with the average output current.

The method can be implemented using the circuits described above in connections with FIGS. 1-5.

As described above, embodiments of the invention provide circuits and methods for adjusting driving current to an LED lamp based on the output voltage of a dimmer that varies the input line voltage. In some embodiments, the dimmer output voltage is converted to current to vary the on-off duty cycle of a power switch. In a specific embodiment, a constant-current mode switch mode controller determines the duty cycle of the control signal by charging and discharging a capacitor. With a dimmer circuit for varying the input line voltage, the duty cycle is adjusted by adjusting the charging and discharging currents with the average output of the dimmer circuit. The method provides a wide range of LED driving current and is compatible with different types and specific functions of dimmer circuit. Thus, the LED driving capability is improved and energy loss is reduced.

In the above description, specific circuits and examples are used to illustrate the embodiments, it is understood that the examples and embodiments described herein are for illustrative purposes only and that various modifications or changes in light thereof will be suggested to persons skilled in the art and are to be included within the spirit and purview of this invention.

What is claimed is:

1. A control circuit for providing a pulsed control signal, the control circuit comprises:
   an input terminal for receiving an input voltage;
   an output terminal for providing a pulsed control signal;
   a capacitor; and
   a comparator;
   wherein the pulsed control signal is characterized by a duty cycle that is determined by a charging current and a discharging current coupled to the capacitor, the charging current and the discharging current being related to the input voltage.

2. The control circuit of claim 1 wherein the charging current is determined by a difference between a first signal and a second signal, and the discharging current is determined by a sum of the first signal and the second signal, wherein the first signal is derived from the input voltage, and the second signal is derived from a first reference signal.

3. The control circuit of claim 2 further comprising:
   a first PMOS current mirror coupled to the first signal;
   a first NMOS current mirror coupled to the second signal, a first output of the first NMOS current mirror coupled to a first output of the first PMOS current mirror for providing the difference between the first signal and the second signal;
   a second PMOS current mirror coupled to a second output of the first NMOS current mirror, an output of the second PMOS current mirror coupled to a second output of the first PMOS current mirror for producing the sum of the first signal and the second signal.

4. The control circuit of claim 2 wherein the duty cycle of the pulsed control signal is determined by (I1−I2)/(I1+I2), wherein I1 represents the first signal and I2 represents the second signal.

5. A system for driving an LED (light-emitting diode) lamp, comprising:
   a dimmer circuit coupled to a line input voltage for varying a magnitude of an input voltage;
   a transformer having a primary winding, a secondary winding, and one or more auxiliary windings, the primary winding coupled to the dimmer circuit;
   an output rectifying circuit coupled to the secondary winding for providing an output current to the LED lamp;
   a power switch coupled to the primary winding for controlling a current flow in the primary winding;
   a controller having a comparator and a capacitor, for providing a control signal to control the power switch for regulating the output current, the controller coupled to the dimmer circuit for receiving an average input voltage signal from the dimmer circuit, wherein the control signal is characterized by a duty cycle that is determined by a ratio of a charging current to a discharging current coupled to the capacitor, the ratio being related to the average input voltage signal from the dimmer circuit.

6. The system of claim 5 wherein the charging current is determined by a difference between a first signal and a second signal, and the discharging current is determined by a sum of a third signal and a fourth signal, wherein the first signal and the third signal are derived from the average input voltage signal, and the second signal and the fourth signal are derived from a first reference signal.

7. The system of claim 6 wherein the first signal is derived from the average input voltage signal through a first current mirror, the third signal is derived from the average input voltage signal through a second current mirror, the second signal is derived from the first reference signal through a third current mirror, and the fourth signal is derived from the first reference signal through a fourth current mirror.

8. The system of claim 7 wherein the charging current is derived from a fifth current mirror coupled a first node coupled to the first signal and the second signal, and the discharging current is derived from a sixth current mirror connected to the third signal and the fourth signal.

9. The system of claim 8 wherein each of the first, the second, and the fifth current mirrors comprises PMOS transistors.

10. The system of claim 8 wherein each of the third, the fourth, and the sixth current mirrors comprises NMOS transistors.

11. The system of claim 5 wherein the charging current is determined by a difference between a first signal and a second signal, and the discharging current is determined by a sum of the first signal and the second signal, wherein the first signal is derived from the average input voltage signal, and the second signal is derived from a first reference signal.

12. The system of claim 11 wherein a minimum output current provided to the LED lamp is about 2% of a maximum output current.

13. The system of claim 5 wherein the controller further comprises:
   a voltage follower for receiving the average input voltage signal;
   a substractor coupled to the voltage follower;
   a first current mirror coupled to the substractor, a current selector configured to receive a current from the first current mirror; and a second current mirror configured to receive a first reference voltage and to provide three reference currents, two of the reference currents being coupled to the current selector, wherein the current selector are configured to provide two output signals, a first output signal coupled to a peak current comparator, a second output signal coupled to a constant-current control circuit for adjusting the ratio of charging and discharging current.

* * * * *